US007222293B1

(12) United States Patent
Zapiec et al.

(10) Patent No.: US 7,222,293 B1
(45) Date of Patent: May 22, 2007

(54) PROFESSIONAL TIME TRACKING AND REPORTING SYSTEM

(75) Inventors: Charles J. Zapiec, Yardley, PA (US); Daniel A. Greenberg, Kendell Park, NJ (US); Mark Winwood, Longwood, FL (US)

(73) Assignee: Applieoe, Inc., Northport, NY (US)

( * ) Notice: Subject to any disclaimer, the term of this patent is extended or adjusted under 35 U.S.C. 154(b) by 0 days.

(21) Appl. No.: 09/636,448

(22) Filed: Aug. 11, 2000

Related U.S. Application Data

(60) Provisional application No. 60/148,491, filed on Aug. 12, 1999.

(51) Int. Cl.
*G06F 17/00* (2006.01)

(52) U.S. Cl. ........................ 715/503; 709/224; 705/32; 455/406; 379/114.03

(58) Field of Classification Search .................. 705/32, 705/9; 379/114.03; 455/406; 709/203, 709/223, 224, 229; 713/193; 715/503, 762
See application file for complete search history.

(56) References Cited

U.S. PATENT DOCUMENTS

| | | | | |
|---|---|---|---|---|
| 5,796,952 | A | 8/1998 | Davis et al. | |
| 5,819,092 | A * | 10/1998 | Ferguson et al. | 717/113 |
| 5,898,780 | A * | 4/1999 | Liu et al. | 713/155 |
| 5,954,798 | A | 9/1999 | Shelton et al. | |
| 5,958,016 | A | 9/1999 | Chang et al. | |
| 5,963,914 | A * | 10/1999 | Skinner et al. | 705/11 |
| 5,966,705 | A * | 10/1999 | Koneru et al. | 707/9 |
| 5,970,477 | A * | 10/1999 | Roden | 705/32 |
| 5,987,430 | A * | 11/1999 | Van Horne et al. | 705/34 |
| 6,014,651 | A * | 1/2000 | Crawford | 705/400 |
| 6,018,619 | A * | 1/2000 | Allard et al. | 709/224 |
| 6,047,268 | A * | 4/2000 | Bartoli et al. | 705/35 |
| 6,112,240 | A * | 8/2000 | Pogue et al. | 709/224 |
| 6,128,601 | A * | 10/2000 | Van Horne et al. | 705/34 |
| 6,151,601 | A * | 11/2000 | Papierniak et al. | 707/10 |
| 6,223,292 | B1 * | 4/2001 | Dean et al. | 726/28 |

(Continued)

OTHER PUBLICATIONS

Hill et al., "New Software Application for Northern Telecom's Norstar Digital Key System Allows Professionals to Use Telephon to Track Billable Time", Business Wire, New York, Jun. 13, 1989, Sec. 1, p. 1.*

(Continued)

*Primary Examiner*—Andrew Joseph Rudy
(74) *Attorney, Agent, or Firm*—IP Strategies

(57) ABSTRACT

An apparatus and a method for tracking time spent on one or more Internet sites. The tracked information may then be used to generate detailed records containing the Uniform Resource Locators (URLs) of the sites visited, the exact time spent on each site, and a record of any downloads, file transfers, or other activities performed by the user. One or more reports may be generated from the detailed records and list the activity by each user, tabulating the web site accessed and the time spent on that web site. This information may then be utilized to generate an invoice for the work performed. The reports may be generated are stored electronically, and may be accessed by an invoicing program which uses stored hourly rates in conjunction with the information in the report to generate a detailed invoice for the client. The invention may be deployed on a personal computer, and enabled by a service operator who provides the time tracking and recouping system (e.g., a software means).

20 Claims, 11 Drawing Sheets

U.S. PATENT DOCUMENTS

| | | | | |
|---|---|---|---|---|
| 6,233,604 | B1 * | 5/2001 | Van Horne et al. | 709/203 |
| 6,282,552 | B1 * | 8/2001 | Thompson et al. | 707/505 |
| 6,286,046 | B1 * | 9/2001 | Bryant | 709/224 |
| 6,289,460 | B1 * | 9/2001 | Hajmiragha | 713/200 |
| 6,292,801 | B1 * | 9/2001 | Campbell et al. | 707/10 |
| 6,317,792 | B1 * | 11/2001 | Mundy et al. | 709/227 |
| 6,341,290 | B1 * | 1/2002 | Lombardo et al. | 707/104.1 |
| 6,367,013 | B1 * | 4/2002 | Bisbee et al. | 713/718 |
| 6,411,998 | B1 * | 6/2002 | Bryant et al. | 709/224 |
| 6,446,200 | B1 * | 9/2002 | Ball et al. | 713/1 |
| 6,519,592 | B1 * | 2/2003 | Getchius et al. | 707/6 |
| 6,567,850 | B1 * | 5/2003 | Freishtat et al. | 709/224 |
| 6,570,610 | B1 * | 5/2003 | Kipust | 348/156 |
| 6,606,657 | B1 * | 8/2003 | Zilberstein et al. | 709/224 |
| 6,622,128 | B1 * | 9/2003 | Bedell et al. | 705/30 |
| 6,654,726 | B1 * | 11/2003 | Hanzek | 705/26 |
| 6,718,328 | B1 * | 4/2004 | Norris | 707/9 |
| 7,013,001 | B1 * | 3/2006 | Felger et al. | 379/115.02 |
| 7,069,498 | B1 * | 6/2006 | Finch et al. | 715/503 |

OTHER PUBLICATIONS

Journyx, "Journyx and IBM Team to Deliver Enterprise Project and Time Tracking Software", Austin, Texas, Apr. 5, 1999, three pages.*

* cited by examiner

501

REPORT BY CLIENT MATTER NUMBER

CLIENT MATTER #: 61124-429

503 505 507 509 511 513

| DATE | USER | TIME IN | TIME OUT | SITE | TIME SPENT |
|---|---|---|---|---|---|
| 6/2/99 | CFN | 10:40 AM | 10:56 AM | HTTP://WWW.WSJ.COM<br>WALL STREET JOURNAL | 0.267 HOURS |
| 6/2/99 | JDB | 10:50 AM | 12:08 PM | HTTP://HIEROSGAMOS.COM<br>HIEROS GAMOS | 1.300 HOURS |
| ⋮ | ⋮ | ⋮ | ⋮ | ⋮ | ⋮ |
| 6/6/99 | DWF | 03:17 PM | 04:03 PM | HTTP://LAWNEWSNETWORK.COM<br>LAW NEWS NETWORK | 0.767 HOURS |

REPORT BY USER ID FOR DATE RANGE

517

USER ID: BARKLEY, JONATHAN D. (JDB)

| DATE (519) | CLIENT MATTER NUMBER (521) | TIME IN (523) | TIME OUT (525) | SITE (527) | TIME SPENT (529) |
|---|---|---|---|---|---|
| 5/12/99 | 04396-012 | 10:12 AM | 11:02 AM | HTTP://WWW.NYTIMES.COM<br>NEW YORK TIMES | 0.833 HOURS |
| 5/12/99 | 62497-263 | 11:03 AM | 11:37 PM | HTTP://COURTS.SDNY.GOV<br>SOUTHERN DISTRICT OF NY | 0.567 HOURS |
| ⋮ | ⋮ | ⋮ | ⋮ | | ⋮ |
| 5/12/99 | 51165-307 | 01:14 PM | 03:27 PM | HTTP://FINDLAW.COM<br>FINDLAW.COM | 2.217 HOURS |

*FIG. 5B*

PROFESSIONAL TIME TRACKING AND REPORTING SYSTEM

This application claims priority under 35 U.S.C. §119(e) for provisional application No. 60/148,491 filed on Aug. 12, 1999.

BACKGROUND OF THE INVENTION

The Internet provides a vast array of materials, which are essential for legal, scientific, medical, accounting, consulting financial, business evaluation, and insurance work. These materials include textual documents, multimedia materials, databases, and other forms of information.

In the legal field, the types of information being placed online (on the Internet) include court decisions, federal, state, and local statutes, and other governmental information. Law firms make extensive use of the Internet and need to obtain this information to conduct business for their clients. Similarly, the accounting consulting firms and business consulting firms extensively perform business research and competitive intelligence analysis on the Internet. Scientists and engineers often perform scientific and technical research on the Internet.

In many professions, including law firms, accounting firms, management consulting firms, investigators, and financial and business analysts, the expenses incurred in obtaining the information from the Internet must be recovered from the client. The client, in many instances, will insist on a detailed record of the time spent performing research on the Internet. The clients generally require a detailed list of the work performed including the web sites visited, the time spent on each web site, and what was accomplished.

Traditional methods for time tracking include manually entering ¼ hour increments on time sheets, or manually entering time increments into a time tracking program running on a mainframe or a personal computer. Some traditional time tracking systems utilize computers and allow lawyers, and other professionals, to select client matter numbers that allocate time to the appropriate client matter, and generate the corresponding charge on an invoice in an electronic manner. Yet, even in these computer-based systems, the time entries and associated charges must be manually entered as a direct interface to the Internet, for the purpose of time tracking does not exist.

In addition to time tracking systems, professionals such as lawyers have access to proprietary commercial databases, which they can use for research. These databases contain information that is commonly termed primary source material, and includes court decisions and other critical information. In the past, the time spent researching on these databases and the database charges were tracked and charged to the client.

Thus, as primary source materials migrate onto the Internet and as more and more professionals (users) use the Internet for access to these materials, the difficulty in tracking and billing for this time increases tremendously, due to the lack of appropriate systems. This results in lost billable time and the increase of costs for manual entry of time records, for the companies and law firms using the Internet.

For the foregoing reasons, there is a need for a system and method that can be used to track time spent on the Internet or other network, to monitor sites visited, and to report back the amount of time spent at each site.

SUMMARY OF THE INVENTION

The present invention provides an apparatus and a method for tracking time spent on one or more Internet sites. The tracked information may then be used to generate detailed records containing the Uniform Resource Locators (URLs) of the sites visited, the exact time spent on each site, and a record of any downloads, file transfers, or other activities performed by the user.

One or more reports may be generated from the detailed records and list the activity by each user, tabulating the web site accessed and the time spent on that web site. This information may then be utilized to generate an invoice for the work performed. In one embodiment, the reports are stored electronically and are accessed by an invoicing program, which uses the stored data in conjunction with the established hourly rate to generate a detailed invoice for the client.

The present invention may be deployed on a personal computer, and enabled by a service operator who provides the time tracking and recouping system (i.e., a software implementation). In this implementation, files with web site usage information are sent periodically to the service provider which charges the user of the software based on the amount of time which they spent accessing web sites. The service provider subsequently receives periodic payments for the use of the software. The actual software may be distributed to users free of charge, and revenues can be collected as recurring payments for the use of the system.

In another embodiment, the service provider may charge the user based on Internet usage and the size of the entity (company or law firm) using the software. This charge is generally based on the usage time that is comparatively lower to the hourly rates being charged to the client. Alternatively, a percentage of the charge received from the client by the user may be forwarded to the service provider for the actual use of the system and the software.

One embodiment of the present invention requires the user to enter a user ID and a client matter number upon initiation of the browser or other software used to access the Internet. Entering the user ID and client matter ensures that the usage time will be charged to clients.

A software implementation in accordance with the principals of the present invention, may operate invisibly in the background, recording each entry including all URLs entered and sites visited. The software implementation may automatically record all the Internet activity and corresponding usage time. As an optional feature, the user may be provided with a capability to disable the functionality of the software, when the user does not wish to track the Internet usage time.

The file containing Internet usage information may be stored locally or on a server accessible via a network. The system administrator may generate, based on the Internet usage information, a variety of reports that summarize the amount of time spent by each user at each site. This information may be manually uploaded or electronically downloaded directly into the firm's time and billing software, which permits recovery of the costs from the client.

One of the features of the present invention is that privacy of the users and the clients is protected and the confidential information associated with the user and the client is not distributed. The information transmitted to the service provider includes the user ID and the history of the searches with sufficient detail to calculate and create an invoice having service charges for using the time tracking and recouping system. This allows the specific and detailed information in reference to that bill to remain protected and precludes the dissemination of the information over the network. The information including the client/matter number, the record of the downloaded files, and any other information related to the client matter remains at the law firm or at other professional sites, and is not disseminated.

In another embodiment of the invention, the principles of the present invention are used to track Internet usage of employees or contractors which are working remotely, including the individuals working at home. The Internet access history may also be used to determine if the employee or contractor has used time searching the Internet appropriately. In some circumstances the remuneration to the employee or contractor may be linked to the effective use of the Internet.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 5A illustrates an exemplary report sorted by client matter number;

FIG. 5B illustrates an exemplary report sorted by user ID;

DETAILED DESCRIPTION OF THE PREFERRED EMBODIMENT

Figure 1:
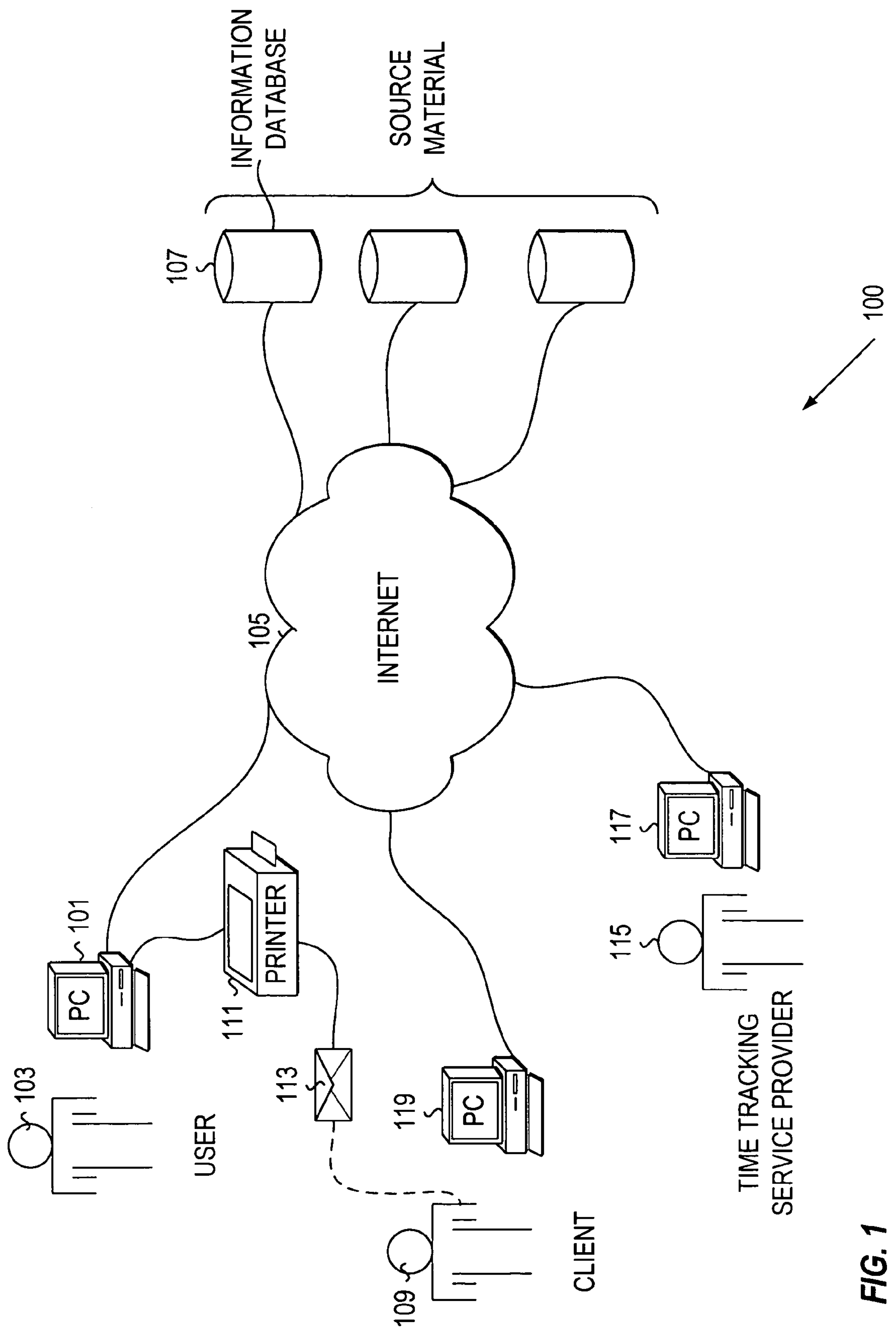
FIG. 1 illustrates an exemplary context diagram representing the system in use.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 9 in particular, the system of the present invention is disclosed.

FIG. 1 illustrates a time tracking and recouping system 100 in accordance with the principles of the present invention. The system is employed at a client side represented as the Personal Computer (PC) 101 to be used by a user 103 shown in the upper left-hand corner. In a law firm environment, the principles of the present invention may be implemented as software, resident on the lawyer's PC, paralegal's PC, or a centralized PC (i.e., a library PC). The software may be used to track attorney, paralegal and other professional's research time on the Internet. This may be accomplished by providing functionality that requires the lawyer or other professional to logon and enter a client matter number before using the PC to access the Internet.

Although the PC 101 shown is connected directly to the Internet 105 in FIG. 1, the PC 101 may be part of a network or series of networks that subsequently access the Internet or other information databases that contain source material as shown on the right side of FIG. 1. The source material may be primary or secondary source material. When used herein the term primary source material refers to information directly accessible to the public including case law, statutes, recent court decisions, or other materials of use to the professional. The secondary source material includes literature, articles, or reports and other information that are generated based on primary source material, and which may be of use to the professional. For the purposes of the principles of the present invention, the primary and secondary source material may be information compiled by a service provider, who may charge an access fee for using or accessing the material.

If in using the system 100, the user 103 via PC 101 searches the Internet for information for a client matter, the sites visited and time spent on Internet are recorded by the system 100 and stored on the hard drive of PC 101 or on another on-site or off-site storage site such as a remotely located network server (not shown). The information regarding the Internet usage may be stored as an Internet access history ledger that may be subsequently accessed to generate a listing of the time spent surfing the Internet for the client matter. The user 103, e.g., a lawyer or law firm can then generate an invoice for the time spent on the Internet and send that bill to the client.

In an alternate embodiment, the principles of the present invention may be used to track Internet usage by employees or contractors working remotely, including individuals working from their home. In this case the professional, illustrated as the user 103 in FIG. 1, may be working at home. The professional may also be an individual who is being paid to perform research on the Internet as part of their job function. In this embodiment, the client 109 of FIG. 1 is the employer, who receives a record of the Internet usage from the time tracking service provider. The employer may use this information to determine if the employee or contractor has used the time on the Internet appropriately. In some circumstances, the employee's pay may be dependent on their usage of the Internet. In addition, the employer may use the information for creating an invoice for a client of the firm, as previously described.

One feature of the present invention is that the invoice generated, based on the collected information, contains detailed specific information regarding the sites visited and the time spent on the sites. This ensures the client that the time spent by the professional was well spent, and was indeed related to the matter at hand. As shown in FIG. 1 an invoice 113 may be printed via printer 111 and may be subsequently transmitted to client 109. Alternatively, an electronic invoice (not shown) may be directly transmitted from PC 101 to PC 119 for the time spent accessing information on the network.

One feature of the system is the ability to generate revenue for the time tracking services. As shown in FIG. 1 a time tracking service provider 115 may employ software or a system that provides a service to be used by user 103 to recoup the cost of the research activity from the client. This may be accomplished by transmitting a file from the user 103 to the time tracking service provider 105 indicating the amount of time spent on the Internet. The transmitted file may be a copy of the record created by the system 100 at the user PC 101. The time tracking service provider 115, in an automated fashion, via the use of a personal computer (PC) 117 may generate an invoice for the user 103 who then pays the time tracking service provider 115 for this time tracking and recouping service system and software.

It is to be noted that the usage time may be collected over one Internet session, or alternatively, may be accumulated over a plurality of Internet sessions and subsequently processed. The process of billing for the actual use of the service may occur automatically and transparently to the user 103 who is using the system, so that payments are in fact made automatically to the time tracking service provider 115. In an alternate embodiment, the data files are sent to the tracking service provider 115 automatically, and in return, the user 103 or other professional receives an invoice in the mail and pays it using traditional methods.

In one embodiment, software in accordance with the principles of the present invention resides on the user's PC 101 that automatically transmits the Internet access history of the Internet usage using an Internet File Transfer Protocol (FTP). This may occur in real-time while the user accesses the Internet. Alternatively, the transmission of the Internet access history ledger to the service provider may occur on a daily/weekly/monthly basis during off-peak hours. Preferably, the Internet usage data is collected for one Internet session (i.e., from the time the user logs on to the time when the user logs out).

Figure 2:
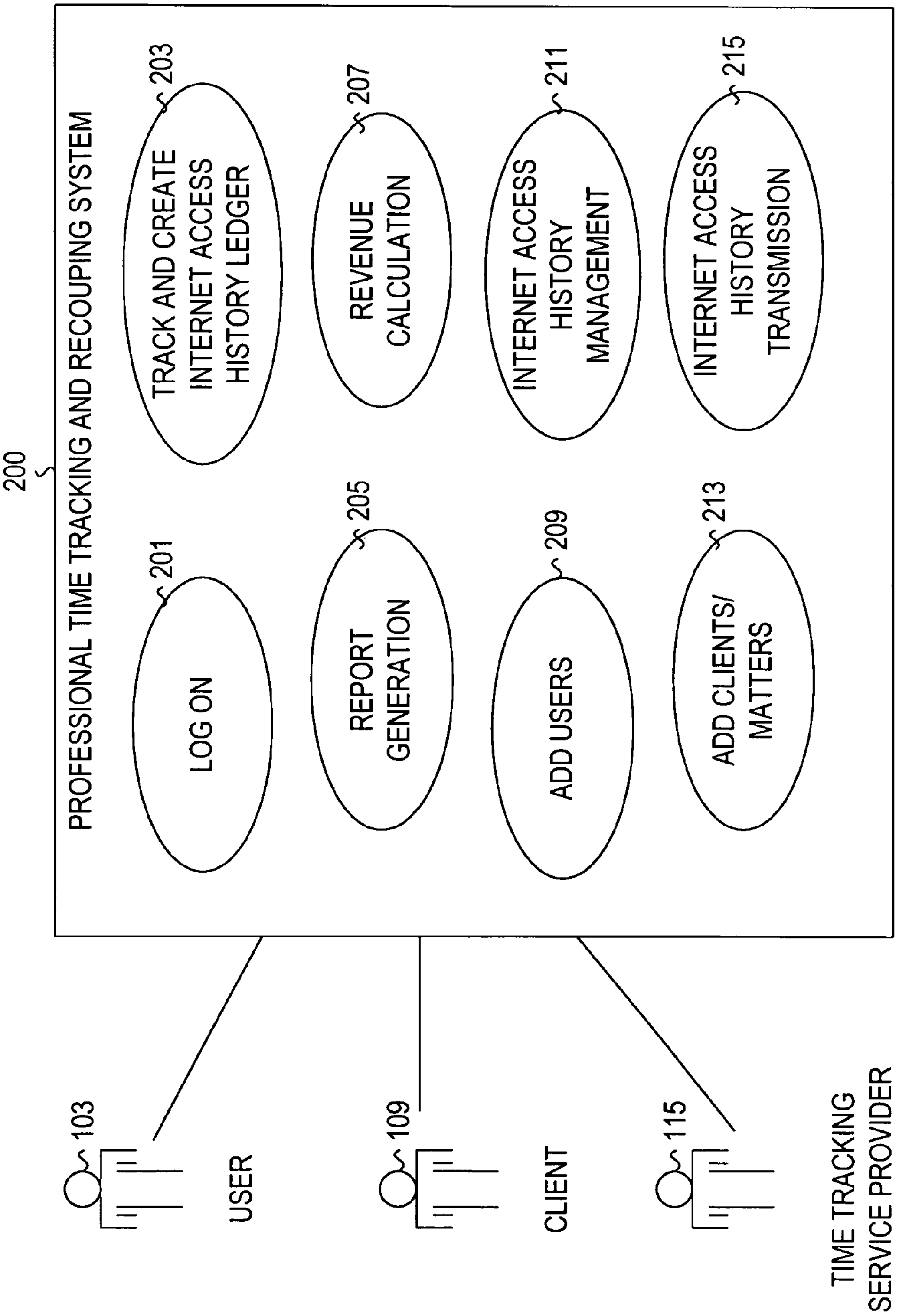
FIG. 2 illustrates an exemplary use-case model representation of the system.

FIG. 2 illustrates a use-case diagram for the time tracking and recouping system and software. In FIG. 2 the same actors as those described in FIG. 1 are illustrated. As with FIG. 1, the user 103 is a representative of a professional using the system and a number of other professionals including paralegals, scientific researchers, accountants, or physicians can use the system for their research. It is to be noted that the invention is not limited to one particular professional group but can be utilized by any professional interested in tracking time.

The use-case diagram of a professional time tracking and recouping system 200, as illustrated in FIG. 2, contains the function modules of logon 201, track and create Internet access history ledger 203, report generation 205, revenue calculation 207, add users 209, Internet access history management 211, add client/matters 213, and Internet access history ledger transmission 215.

The logon function module 201 describes the way in which a user logs on using a user ID and identifies a client for which the work will be performed. The track and create Internet access history ledger module 203 represents the function of tracking the Internet sites visited and monitoring and calculating the time spent on each site. This includes the ability to monitor each individual Web page visited and can include monitoring of downloads and other Web based operations. The report generation module 205 generates the detailed list of sites visited and the time spent on each site based on the tracking, which is recorded by the track and create Internet access history ledger function.

The revenue calculation module 207 is used by the time tracking service provider to determine the fee for using the system and software and to invoice the lawyer or other professional. The add users module 209 is used by the user 103 or other administrative staff of the professional organization to add users to the system. The Internet access history management module 211 is used by the system administrator to control specifics of the Internet access history ledger, including tracking of the sites visited, filtering the sites visited and reading the ledger itself. The add clients/matters module 213 allows an administrator or professional to add client matter numbers and clients to a log file. The Internet access history transmission module 215 can be used to transmit the Internet access history ledger to the time tracking service provider for revenue calculation.

One feature of the system of FIG. 2 is the ability of the add clients/matters function to interface with other time billing and management systems such that once clients/matters are added to the master time billing system they can be automatically input into the time tracking and recouping system. Another feature of the invention is the ability of the time tracking and recouping system 200 to interface with docketing systems such that client matters can be retrieved from a patent or other legal matter docking system.

Figure 3A:
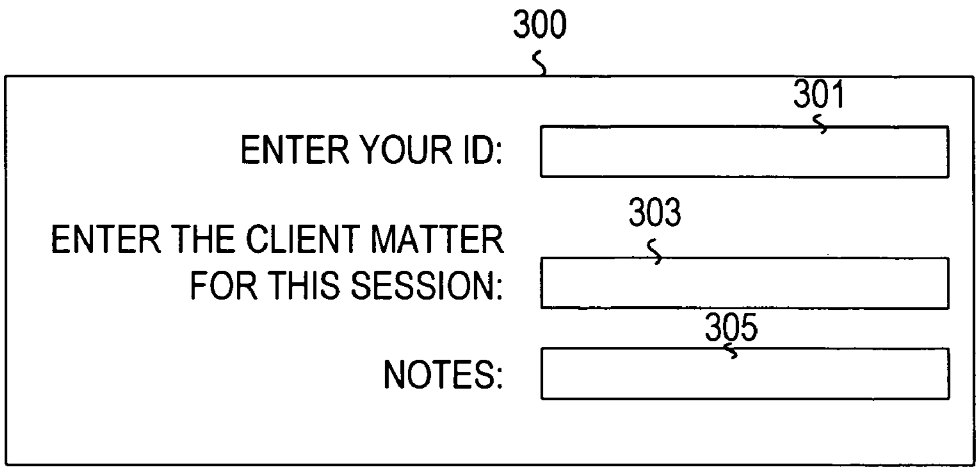
FIG. 3A illustrates an exemplary time tracking and recouping system logon window.

In accordance with the principles of the present invention, the system may require user authentication prior to permitting the use of the system. FIG. 3A represents an exemplary logon window 300 for a system operating in accordance with the principles of the present invention. For example, FIG. 3 illustrates how the user 103 may be presented with a request to enter an ID number 301, enter the client matter for the session and enter any optional text in a notes field 305, such as a name of a current matter or project.

Figure 3B:
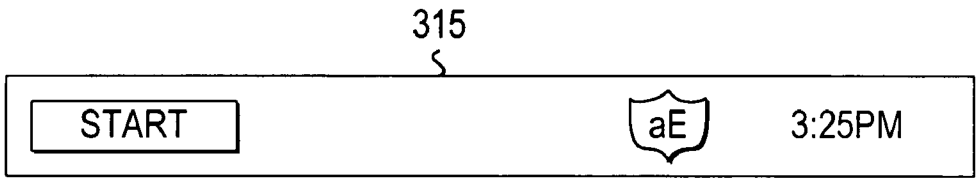
FIG. 3B illustrates an exemplary time tracking and recouping system icon in a system tray.

FIG. 3B represents an exemplary icon 315 for the system, which in this case is labeled "aE". This icon may appear in a system tray when the user is using the operating system sold by the Microsoft Corporation, Redmond, Wash., under the trademark WINDOWS. Although this embodiment of the present invention is illustrated as being part of a WINDOWS-based system, the invention is not limited to a specific operating system embodiment but can in fact be used on other operating systems including Macintosh, Unix, or Linux.

Figure 3C:
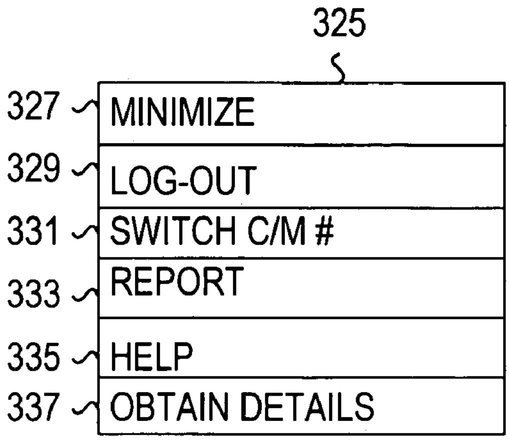
FIG. 3C illustrates an exemplary time tracking and recouping system menu presented to the user.

FIG. 3C represents an exemplary menu that may be presented to the user 103 after the user has clicked on the icon in the system tray. The menu 325 presents different options to the user 103 including minimizing the window 327, logging out of the system 329, the client matter number 331, generating a report 333, looking for help 335 (i.e., determining the revision number), and obtaining details regarding the system software 337.

In one embodiment, the present invention is implemented as a time tracking and recouping software that may be downloaded to the computer of a user, such as a lawyer or other professional, wherein the software operates transparently in conjunction with the existing browser on the user's computer. The software of the present invention may not be browser-dependent and may work with a number of browsers including the browser sold and/or distributed by the Netscape Corporation, Mountain View, Calif., under the trademark NAVIGATOR or the browser sold by the Microsoft Corporation, Redmond, Wash., under the trademark INTERNET EXPLORER.

In this embodiment, upon installation, the software becomes active at any point upon when the browser is activated and requires the user to logon through a logon window such as that shown in FIG. 3A. Although the user may access the functionality through the icon in the system tray shown in FIG. 3B and may in fact select options shown in FIG. 3C, generally, surfing of the Internet is not permitted without entering a user ID and client matter number.

As an optional feature, the user may can be provided with an option to disable the functionality of the software (i.e., the user may surf the Internet without tracking). Alternatively, especially in the employer_employee environment, the functionality of the software may not be disabled, i.e., all the Internet activities conducted by the user at the employer-provided computer will be recorded and analyzed.

Figure 4:
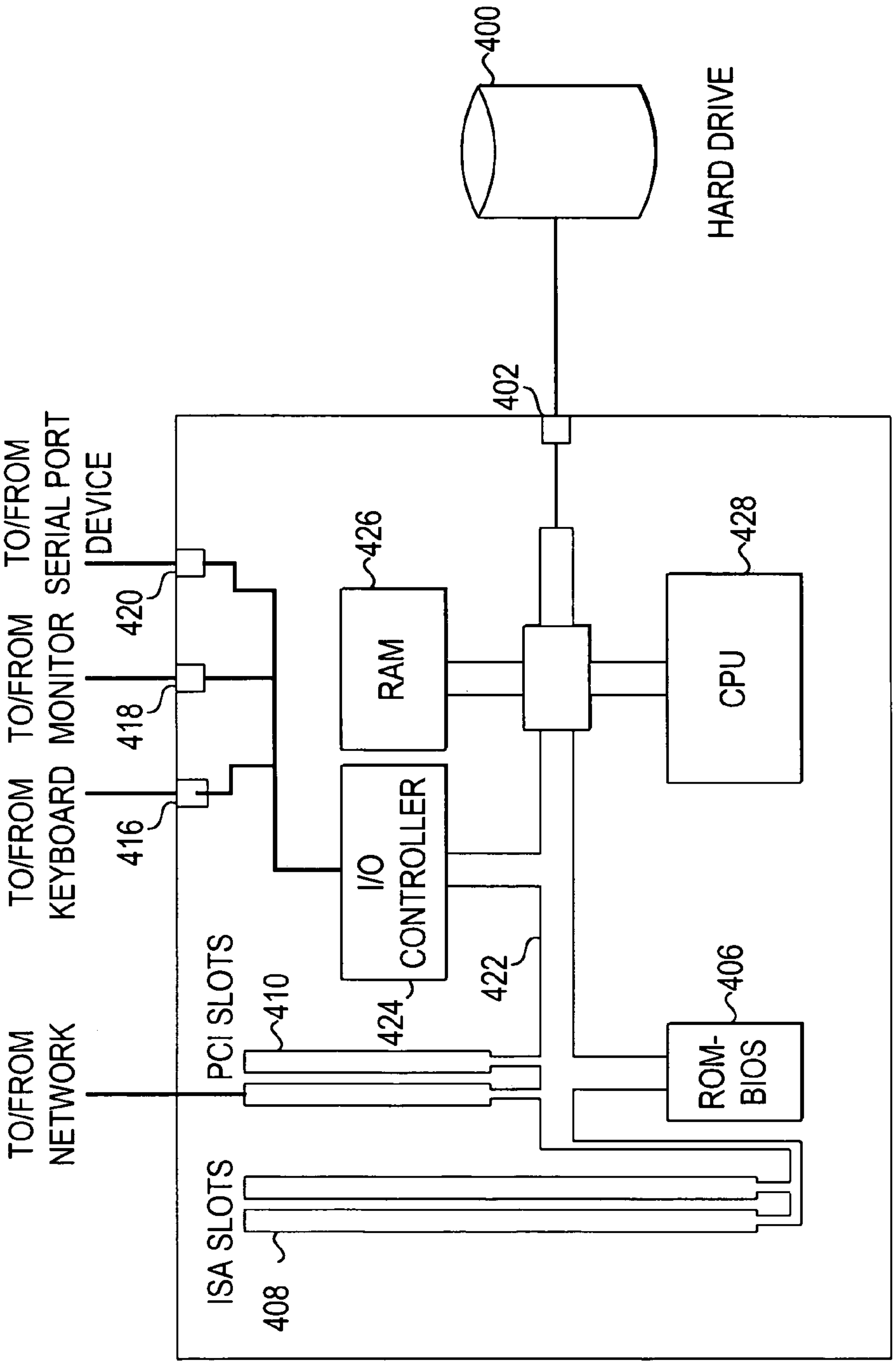
FIG. 4 illustrates an exemplary computer system on which the present invention can be implemented.

FIG. 4 shows the block diagram of an exemplary computer system for the realization of the principles of the present invention especially the time tracking and recouping. In this computer system, the system bus 422 transports data amongst the Central Processing Unit (CPU) 428, the Random Access Memory (RAM) 426, Read Only Memory-Basic Input Output System (ROM-BIOS) 406 and other components. The CPU 428 accesses a hard drive 400 through a disk controller 402. The standard input/output devices are connected to the system bus 422 through the I/O controller 424. A keyboard is attached to the I/O controller 424 through a keyboard port 416 and the monitor is connected through a monitor port 418. The serial port device uses a serial port 420 to communicate with the I/O controller 424. Industry Standard Architecture (ISA) expansion slots 408 and Peripheral Component Interconnect (PCI) expansion slots 410 allow additional cards to be placed into the computer. In a preferred embodiment, a network card is available to interface a local area, wide area, or other network.

Although FIG. 4 represents a specific computer design, the invention may be utilized on a number of different computer types including distributed processing systems or client-server based systems. The software for the time tracking and recouping system may be realized in a number of programming languages known to those skilled in the art including C, C++, Java, Perl and other object oriented or procedural languages. It is to be noted that the use of the present invention is not limited by choice of a specific programming language or combination of languages.

FIG. 5A represents an exemplary report by client matter number. The exemplary report 501 comprises date log 503, user information 505, time in 507, time out 509, site 511 (URL or index of the sites visited), and the actual time spent 513 for a particular date range. As shown in FIG. 5A, the client matter numbers are indicated at the top. Because this system operates across the network, the surfing times may overlap, and a plurality of users simultaneously accessing the Internet may be recorded and reported. FIG. 5A an overlap between different users termed CFN, JDB, and DWF.

FIG. 5B represents another exemplary report 515, wherein the matters are sorted according to the user ID 517. The report comprises date log 519, client matter #521, time in 523, and time spent 529.

Although reports illustrated in FIGS. 5A and 5B represent printed reports, which can be generated, it is also possible to generate electronic reports in formats including spreadsheets and database files. The database files can be used by relational database or object-oriented database programs. In an alternative embodiment, the text files may be generated for transmission to other billing or time tracking software.

Figure 6:
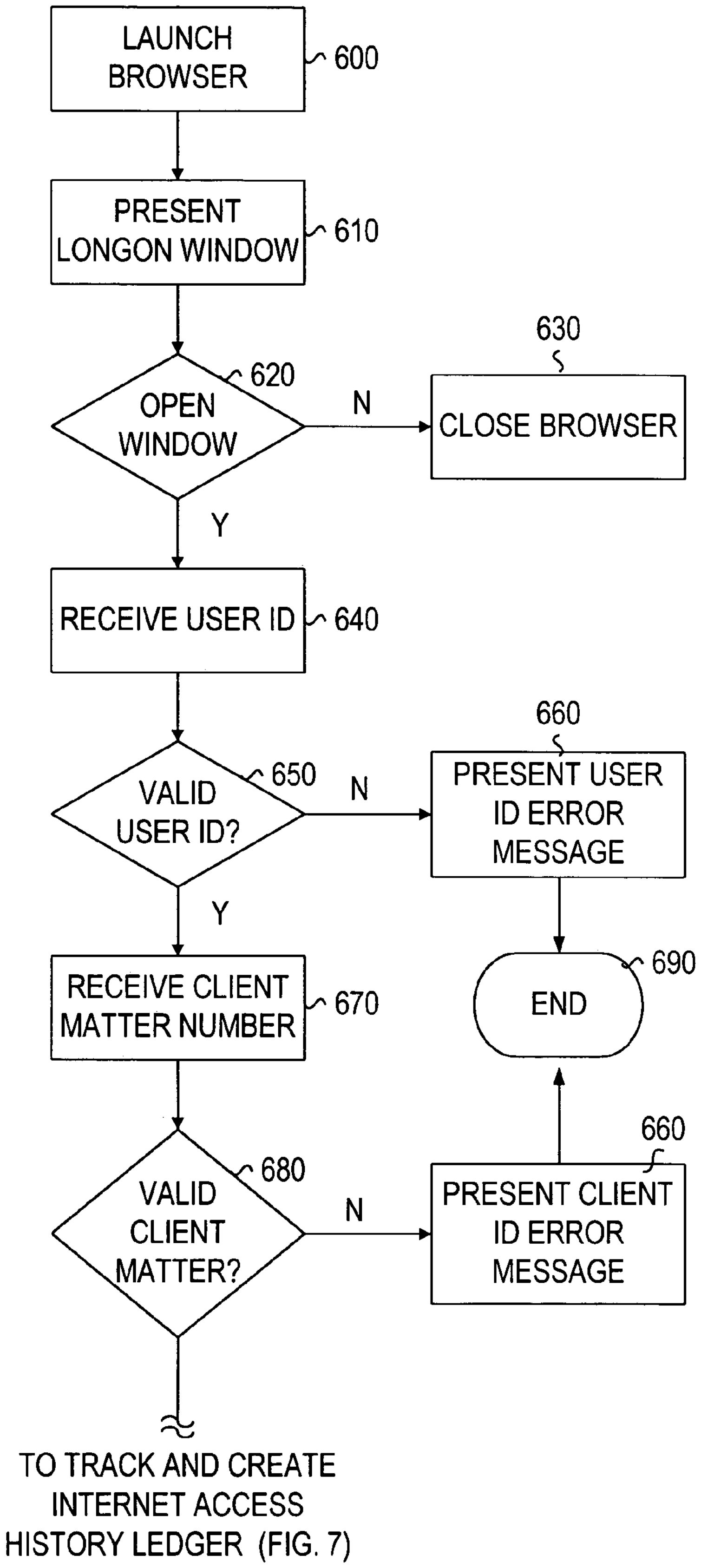
FIG. 6 illustrates a flowchart for the logon function.

FIG. 6 illustrates a flowchart for the logon function in accordance with the principles of the present invention. In this function, the browser is launched in a launch browser step 600. Subsequent to launching the browser, the user is presented a logon window in step 610. The next step 620 is a decision function to determine if the corresponding window is open or if the window has been closed by the user. If in step 620 it is determined that the browser is closed, subsequently in step 630 the window is closed. This ensures that if a user ID and client matter number have not been entered it is impossible to use the browser.

If in step 620 it is determined that the window is open, then in step 640, the user ID is received. Subsequently, in step 650, a test is performed to determine the validity of the user ID. If the user ID is not valid an error message is presented in step 660 and the process ends in step 690. If the user ID is valid, a client matter number is requested and received in step 670.

In step 680, it is determined whether the client matter is valid. If the client matter number is invalid, in step 680, an error message is presented and the process ends in step 690. If the client matter number is valid, the process moves on to the track and creates Internet access history ledger as illustrated FIG. 7.

Figure 7:
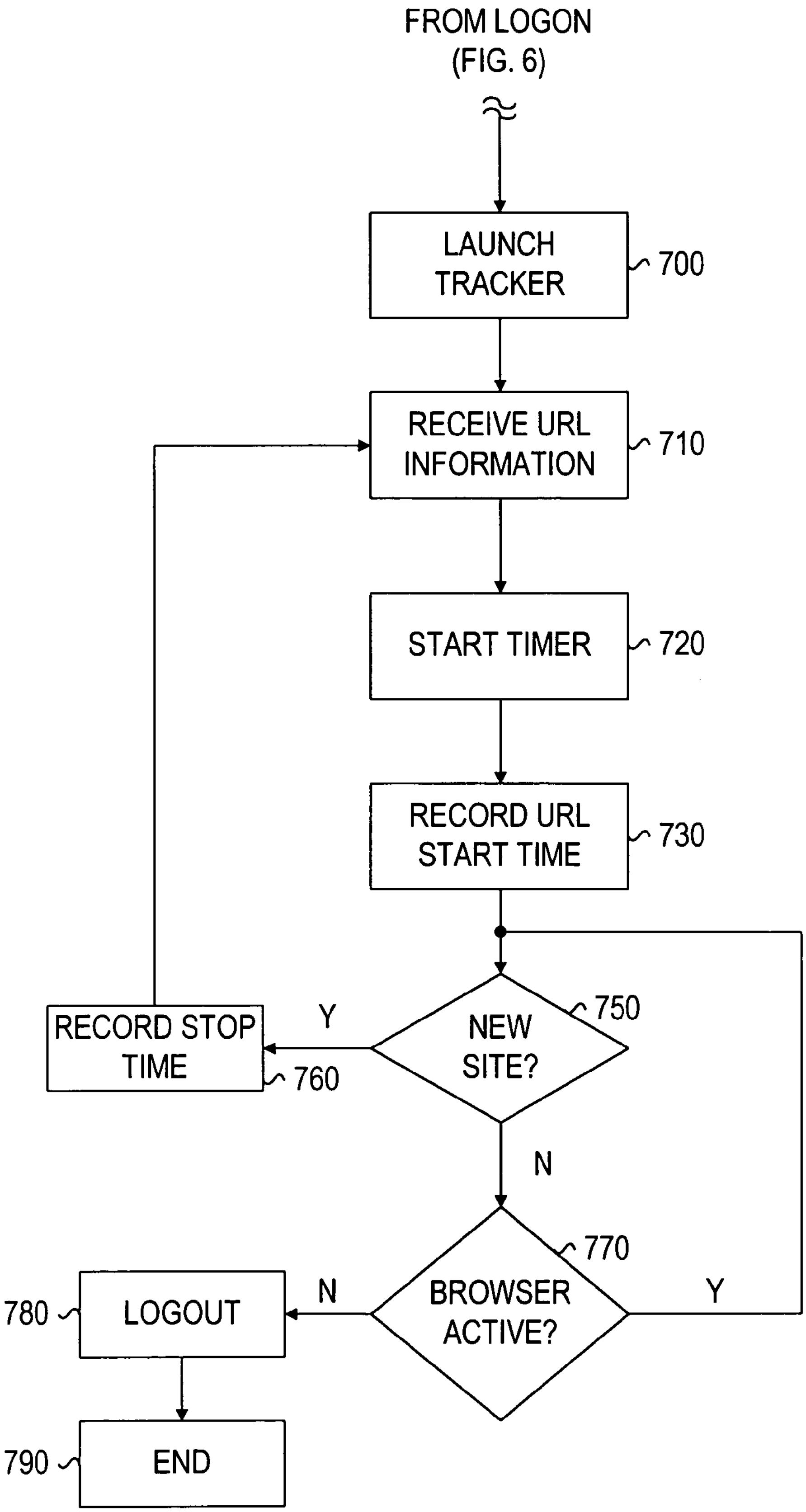
FIG. 7 illustrates a flowchart for the track and create Internet access history function.

FIG. 7 illustrates a flowchart for the track and create Internet access history ledger function in accordance with the principles of the present invention. In this function, the URLs for the sites visited and Web pages presented to the user are recorded.

As shown in FIG. 7 the process starts with a launch tracker step 700 wherein the tracker functionality is launched. Next, in step 810, the corresponding URL information is received from the user. Once the URL information has been entered by the user, a timer is started in step 720. In step 730, the URL start time is recorded and stored in a storage location. This permits recording of each interval during which the user browses a Web site.

Step 750 is a decision to determine if a new site has been accessed by the user. If a new site has been accessed, the stop time is recorded in record stop time step 760 and the process returns to step 710 wherein the new URL information is received.

If a new site has not been entered, next in step 770 it is determined whether the browser is active. Generally, if an excessive amount is passed before a new URL information is received, it is assumed that the user has moved on to perform other matters. The functionality of step 770 effectively acts as a "dead-man switch" to ensure that if the user has walked away from the terminal, opened another window corresponding to another application, or for whatever other reason is no longer active in accessing web sites they will be logged out from the system. If the browser in step 770 is not active, the user is logged out in step 780 and the process ends in step 790. Once logged out the user will need to log on again to reinitiate the procedure as illustrated in FIG. 7. If in step 770 it is determined that the browser is still active, the process returns to step 850 to determine if a new site has been accessed.

Figure 8:
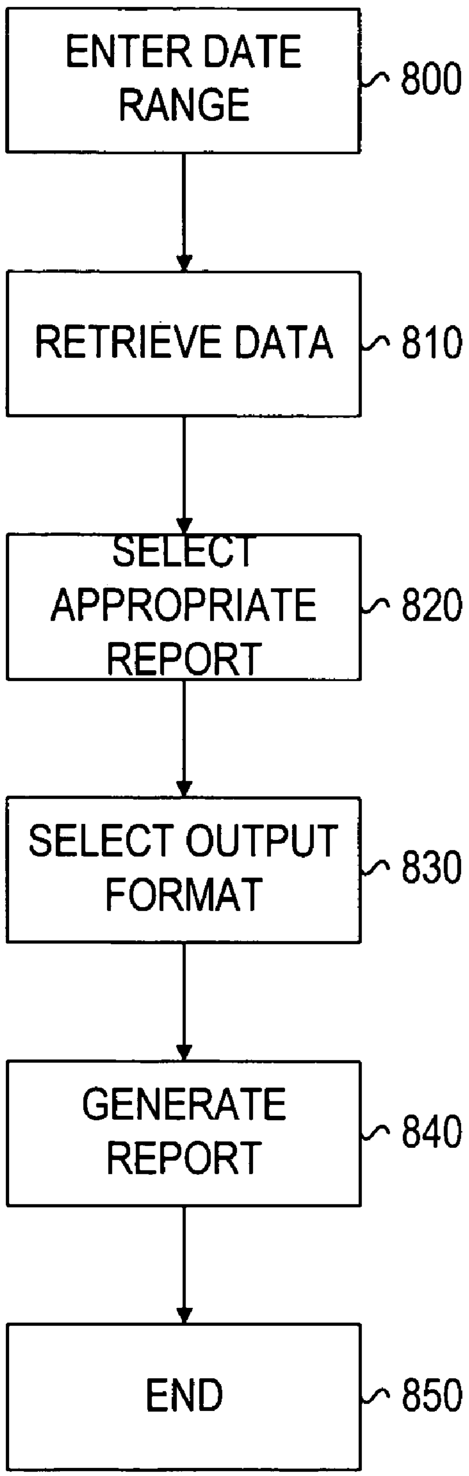
FIG. 8 illustrates a flowchart for the report generation function.

FIG. 8 illustrates a flowchart for report generation function in accordance with the principles of the present invention. In step 800 is a user input function wherein the user is permitted to enter the appropriate date range. Upon receipt of such information, the process moves to step 810 wherein the corresponding access history ledger data is retrieved from a storage location. Step 820, the appropriate type of report is selected. Generally the report selection is based on pre-determined parameters set by the user, for example, the user may select to be added in the report. In step 830, an appropriate output format based on user selections is chosen. In step 840, an applicable report is generated that may be printed or electronically transmitted to the client. Once the report has been generated to be transmitted or printed, the process ends in step 850.

Figure 9:
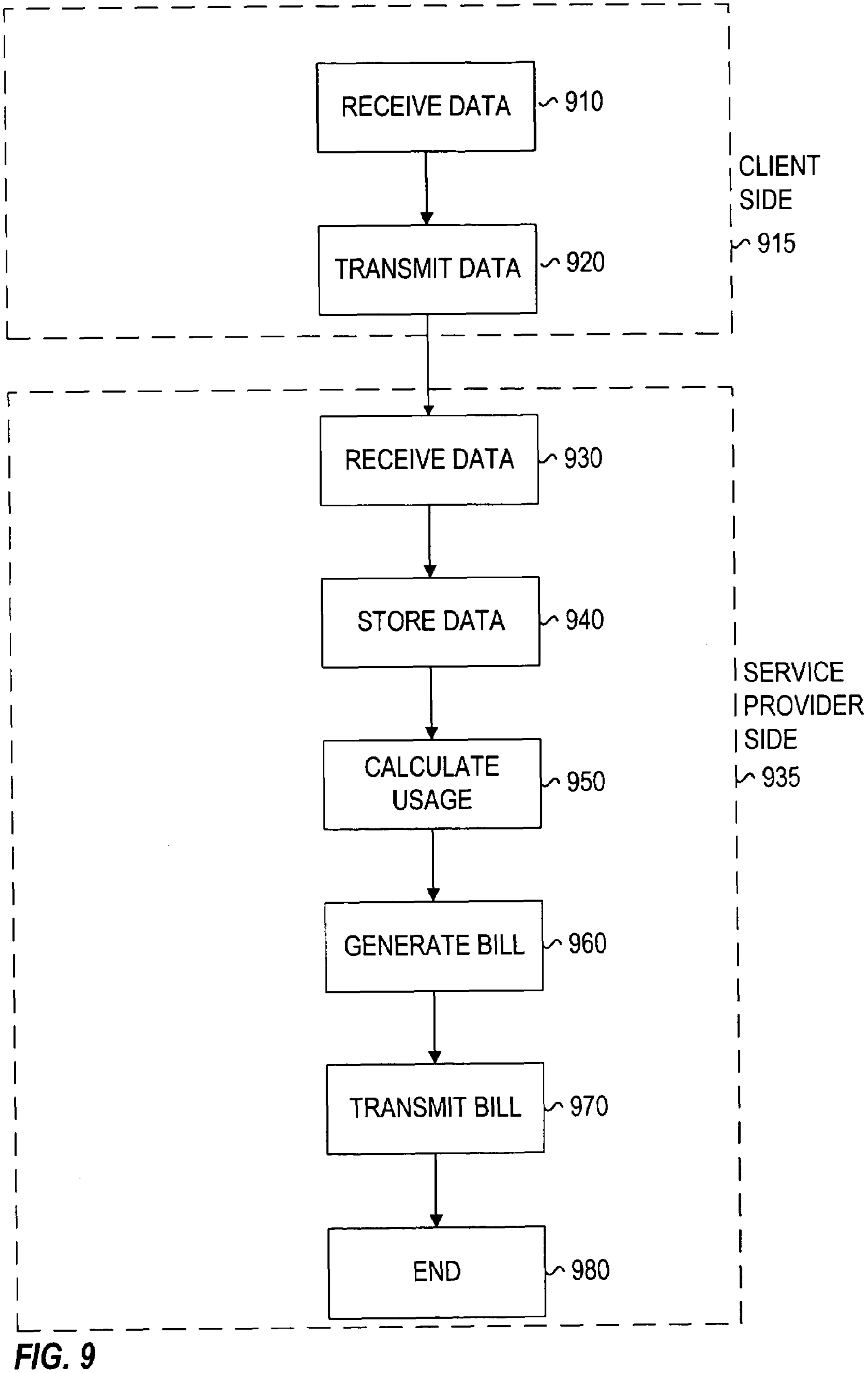
FIG. 9 illustrates a flowchart for the revenue calculation function.
Figure 10:
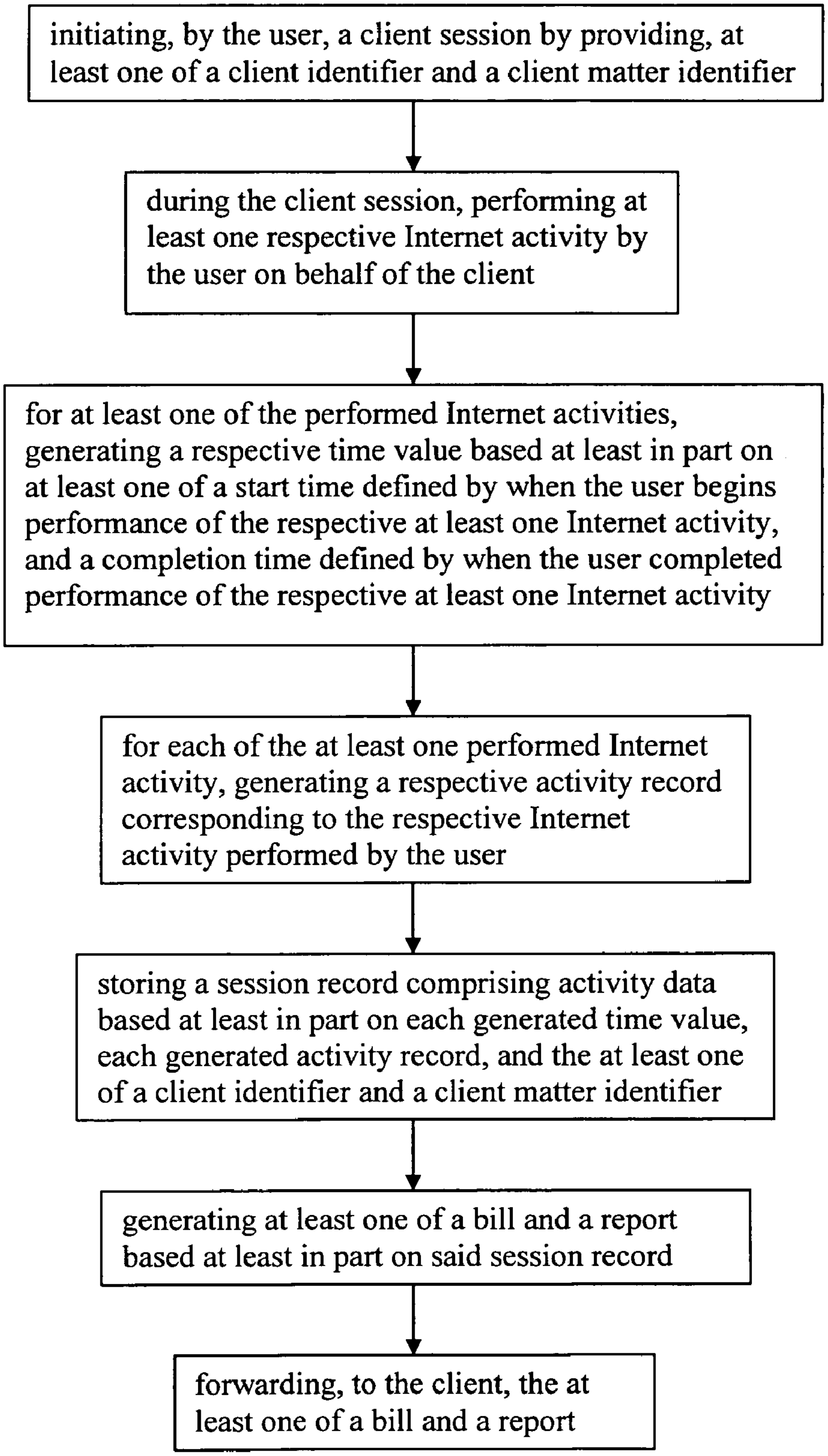
FIG. 10 illustrates a flow diagram corresponding to an exemplary method according to the present invention.

FIG. 9 is a flowchart for the revenue calculation function in accordance with the principles of the present invention. Generally, the revenue calculation function takes place through software operating at the client side, which may be the lawyer or other professional's site. The software or other implementation on the client side retrieves the data in step 910 from a storage location and transmits the data in step 920. In this embodiment, the data is transmitted as an FTP file containing all the relevant information regarding different Web sites the professional has accessed and the time spent on each site. Generally, the FTP transmission takes place transparent to the user and may occur in real-time while the user is accessing Web sites. As an example, the data maybe collected and transmitted for each Internet session (i.e., each time the user logs on to the Internet and searches on the Internet, the session ends when the user logs out). Alternatively, the data may be collected for a plurality of Internet sessions to the appropriate data processing means, for example, the usage time may be collected and transmitted on a daily, weekly, bi-weekly or monthly basis.

The corresponding process on the service provider side termed service includes receiving relevant data and determining the charge for using the services. In step 930, the service provider side receives the relevant data and stores the data in step 940 in storage medium located on the service provider side. In step 950, the usage is computed in a functionality similar to that provided by the tracking to the report generation function shown in FIG. 8. In step 960, a bill is generated, and subsequently, in step 970, the bill is transmitted to the user, e.g., lawyer or other professional. The process ends in step 980.

It is to be noted that the bills generated in step 960 are based on the amount of time that the professional has accessed Internet sites and may also incorporate the size and organizational structure of a professional organization. As an example, when the system is used by lawyers, the lawyers may be grouped into categories, and the reports may be generated for these categories. It is to be noted that instead of bills based on the usage time, the users may be charged a flat fee for the use of the system of the present invention.

Although the various functions of the system have been illustrated as a procedural functions in FIGS. 6, 7, 8, and 9 the system can operate based on an object-oriented programming, in which case objects are called upon to perform the equivalent procedural functions illustrated in FIGS. 6, 7, 8 and 9. Object-oriented programming and the realization of flowcharted functions is well understood by those skilled in the art.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method of automatically recording Internet activity performed by a user on behalf of a client of the user, comprising:

initiating, by the user, a client session by opening an Internet browser window;

denying user access to the Internet;

automatically prompting the user for a user identifier and at least one of a client identifier and a client matter identifier;

providing, by the user, at least one of the user identifier and the at least one of the client identifier and the client matter identifier;

allowing user access to the Internet on provision of the at least one of the user identifier and the at least one of the client identifier and the client matter identifier by the user;

performing Internet activity by the user on behalf of the client;

automatically generating a start time value based at least in part on a start time of the Internet activity;

automatically generating a completion time value based at least in part on a completion time of the Internet activity;

automatically generating an activity record corresponding to the Internet activity performed by the user between the start time and the completion time;

automatically storing a session record including the start time value, the completion time value, and a listing of pages and files accessed by the user while performing the Internet activity;

automatically generating at least one of a bill and a report based at least in part on said session record; and forwarding, to the client, the at least one of the bill and the report;

wherein the Internet activity includes accessing at least one of publicly-available pages and files via the Internet.

2. The method of claim 1, wherein the Internet activity further includes transmitting a request for data via the Internet, and at least one of data entry of a network address, data entry of a URL, data entry of at least one search term, data entry of at least one data instance, selection of a hyperlink, a data transfer, and an input device event.

3. The method of claim 1, wherein generating at least one of the bill and the report includes sorting the session record by at least one of the client identifier, the client matter identifier, and the user identifier.

4. The method of claim 2, wherein the activity record includes information identifying at least one of network addresses accessed by the user, times of URL entries made by the user, a list of search terms entered by the user, captures of data instances accessed by the user, selections of hyperlinks by the user, data transfers made by the user, and input device events performed by the user.

5. The method of claim 1, wherein the Internet activity includes data entry of a URL, selection of a hyperlink, and an input device event.

6. The method of claim 5, wherein the activity record includes information identifying at least one of times of URL entries made by the user, selections of hyperlinks by the user, and input device events performed by the user.

7. The method of claim 1, wherein the client session is initiated on a computer that is connected directly to the Internet.

8. The method of claim 1, wherein the one respective Internet activity is not restricted to activity with a particular content provider.

9. A process of automatically recording Internet activity performed by a user on behalf of a client of the user, comprising:

providing a computer with communication connection to the Internet;

beginning a client session by launching a Web browser program on the computer;

automatically prompting the user for user identification information and at least one of client identification information and client matter identification information;

allowing the browser to fetch information via the Internet only on receipt of the user identification information and the at least one of client identification information and client matter identification information;

entering at least one request for information via the Internet though use of the Web browser program;

ending the client session;

automatically generating a session record of the client session, wherein the session record includes an indication of the time duration of the client session, and a listing of all requests for information entered during the client session;

automatically generating at least a portion of a bill based at least in part on the session record and on a billing rate for the user; and sending the bill to the client.

10. The process of claim 9, wherein the request for information includes entry of an URL in the browser request field.

11. The process of claim 9, wherein the request for information includes clicking on a hyperlink.

12. The process of claim 9, wherein the request for information includes downloading a file.

13. The process of claim 9, wherein ending the client session includes closing the browser application.

14. The process of claim 9, further comprising automatically generating a session report based at least in part on the session record.

15. The process of claim 14, wherein the session report includes the listing of all requests for information entered during the client session.

16. The process of claim 15, wherein the session report includes an access time indication for each listed request for information.

17. The process of claim 15, wherein the session report includes a time duration indication for each listed request for information.

18. The process of claim 14, further comprising storing the session report.

19. The process of claim 15, further comprising retrieving the stored session report for use in a second client session.

20. A magnetic storage medium, comprising instructions that are readable by a processor and that cause the processor to execute the process of claim 9.

* * * * *